US012115518B2

(12) United States Patent
Guo et al.

(10) Patent No.: US 12,115,518 B2
(45) Date of Patent: Oct. 15, 2024

(54) PREPARATION METHOD AND APPLICATION OF COATED VANADIUM-TUNGSTEN-TITANIUM OXIDE MONOLITHIC SCR CATALYST

(71) Applicant: TIANJIN RESEARCH INSTITUTE FOR WATER TRANSPORT ENGINEERING, M.O.T., Tianjin (CN)

(72) Inventors: Mingyu Guo, Tianjin (CN); Yidan Huang, Tianjin (CN); Boqun Liu, Tianjin (CN); Shaoping Cui, Tianjin (CN); Shipei Dong, Tianjin (CN); Siqi Chen, Tianjin (CN); Bin Liu, Tianjin (CN); Yingjie Zhao, Tianjin (CN); Fang Lin, Tianjin (CN); Zhonghua Tian, Tianjin (CN); Junjie Zhao, Tianjin (CN); Wei Ye, Tianjin (CN); Yanjie Wei, Tianjin (CN); Zhipeng Zhang, Tianjin (CN)

(73) Assignee: TIANJIN RESEARCH INSTITUTE FOR WATER TRANSPORT ENGINEERING, M.O.T., Tianjin (CN)

( * ) Notice: Subject to any disclaimer, the term of this patent is extended or adjusted under 35 U.S.C. 154(b) by 0 days.

(21) Appl. No.: 18/539,373

(22) Filed: Dec. 14, 2023

(65) Prior Publication Data

US 2024/0116033 A1 Apr. 11, 2024

(30) Foreign Application Priority Data

Feb. 24, 2023 (CN) ........................ 202310161506.X

(51) Int. Cl.

| | |
|---|---|
| ***B01J 23/00*** | (2006.01) |
| ***B01D 53/94*** | (2006.01) |
| ***B01J 35/57*** | (2024.01) |
| ***B01J 37/00*** | (2006.01) |
| ***B01J 37/02*** | (2006.01) |
| ***B01J 37/04*** | (2006.01) |
| ***B01J 37/08*** | (2006.01) |
| ***F01N 3/20*** | (2006.01) |
| ***F01N 3/28*** | (2006.01) |

(52) U.S. Cl.

CPC ........ *B01J 23/002* (2013.01); *B01D 53/9418* (2013.01); *B01J 35/57* (2024.01); *B01J 37/0018* (2013.01); *B01J 37/0213* (2013.01); *B01J 37/0236* (2013.01); *B01J 37/04* (2013.01); *B01J 37/08* (2013.01); *F01N 3/2066* (2013.01); *F01N 3/2803* (2013.01); *B01D 2255/20707* (2013.01); *B01D 2255/20723* (2013.01); *B01D 2255/20776* (2013.01); *B01D 2255/40* (2013.01); *B01D 2255/9155* (2013.01); *B01D 2257/404* (2013.01); *B01D 2258/012* (2013.01); *B01J 2523/47* (2013.01); *B01J 2523/55* (2013.01); *B01J 2523/69* (2013.01); *F01N 2330/30* (2013.01); *F01N 2370/02* (2013.01)

(58) Field of Classification Search

CPC ...... B01J 23/002; B01J 35/57; B01J 37/0018; B01J 37/0213; B01J 37/0236; B01J 37/04; B01J 37/08; F01N 3/2066; F01N 3/2803

See application file for complete search history.

(56) References Cited

U.S. PATENT DOCUMENTS

2016/0136616 A1* 5/2016 Yoshimura ........... B01J 37/0018 502/309

FOREIGN PATENT DOCUMENTS

| | | | |
|---|---|---|---|
| CN | 105214647 | A | 1/2016 |
| CN | 106076318 | A | 11/2016 |
| CN | 113908842 | A | 1/2022 |

OTHER PUBLICATIONS

CNIPA, Notification of First Office Action for Chinese application CN202310161506.X, Apr. 8, 2023.

CNIPA, Notification to grant patent right for Chinese application CN202310161506.X, Apr. 24, 2023.

* cited by examiner

*Primary Examiner* — Yong L Chu

(57) ABSTRACT

The present invention relates to the technical field of catalyst preparation, disclosing a preparation method and application of a coated vanadium-tungsten-titanium oxide monolithic SCR catalyst. The method includes the steps of mixing a vanadium oxide precursor, a tungsten oxide precursor, titanium dioxide, an inorganic adhesive, an organic adhesive and a macromolecular surfactant with deionized water and stirring them to obtain a thick liquid; adding a pH adjuster to the thick liquid to make its pH 1.5-4.5; impregnating a cordierite honeycomb carrier in the thick liquid to obtain a preliminarily-impregnated catalyst and dried and calcined the preliminarily-impregnated catalyst to obtain a finished catalyst. The method has advantages such as simple operation, easy repetition and short time-consuming, so it can be applied to exhaust gas post-treatment of a marine diesel engine, and provide a good choice for catalysts used to denitrify medium and high temperature exhausted gas from marine engines.

3 Claims, 13 Drawing Sheets

FIG.6

PREPARATION METHOD AND APPLICATION OF COATED VANADIUM-TUNGSTEN-TITANIUM OXIDE MONOLITHIC SCR CATALYST

TECHNICAL FIELD

The present invention relates to the technical field of catalyst preparation, in particular to a preparation method and application of a coated vanadium-tungsten-titanium oxide monolithic SCR catalyst.

BACKGROUND ART

In recent years, the problem of marine emissions has gradually become prominent. $NO_x$ emissions account for more than 80% of total pollutant emissions in recent years, much higher than other pollutant emissions, so the problem of $NO_x$ emissions from marine emissions cannot be ignored and needs to be solved urgently.

A large number of $NO_x$ emissions can harm the environment, destroy the ozone layer and form acid rain, endangering the health of humans, and animals and plants. Because of the serious harmfulness of nitrogen oxides, various countries have also been enhancing the attention and control of $NO_x$ emissions, and the standards and guidelines for their controlling emissions are becoming more and more stringent, but the selective catalytic reduction (SCR) technology is the $NO_x$ emission reduction technology only accepted by the International Maritime Organization that can be used for all kinds of marine engines and watercraft types. SCR denitrification is widely used in industry as an exhaust gas post-treatment technology, which can effectively remove $NO_x$. The principle of SCR denitrification is to use $NH_3$ as a reductant to reduce the nitrogen oxides in the exhaust gas into $N_2$ and $H_2O$ unharmful in pollution under the action of the catalysts, so as to achieve the purpose of reducing $NO_x$ pollution. The SCR catalyst is the core of this technology, so it is necessary to increase efforts to research for achieving localization. At present, the coating method is the most commonly used method for the preparation of monolithic catalysts in industry. This method has advantages such as simple operation, high mechanical properties, a small quantity of used precursor materials and a high utilization ratio of active components. However, this process still has defects such as insufficient coating amount, uneven coating and cracks after calcination, which causes the catalyst a poor loading ratio and shedding ratio, so that active components cannot adhere to the catalyst well, thereby reducing its denitrification performance. Therefore, it is also necessary to study the properties of thick liquid used for coating.

A four-stroke diesel engine among marine diesel engines is widely used in inland ships, but its exhaust temperature is relatively high. So it is necessary to maintain high activity and stability of the SCR catalyst at stages of medium and high temperature. The monolithic honeycomb catalysts have advantages such as a big specific surface area, convenience and flexibility in use, conduciveness to recycling, good corrosion resistance and good heat resistance, and superiority of low coefficient of thermal expansion, high mechanical strength, stable chemical properties, low exhaust resistance and so on. We have found the following published patent documents related to this application by way of searching.

The patent (CN115178254A), a non-toxic, highly active and highly stable rare earth-based $NH_3$-SCR catalyst and its preparation technology, discloses a rare earth-based SCR catalyst and its preparation method. This catalyst has high activity, but high costs and complex process.

The patent (CN110215917A), a carried vanadate metal M SCR catalyst and its preparation method, discloses a vanadate metal M SCR catalyst and its preparation method. This preparation method needs the steps of heating evaporation and an ultrasonic process, resulting in a complex process and high costs.

The patent (CN114984944A), a method for preparing a high anti-sulfur and low-temperature SCR catalyst, discloses a method for preparing low-temperature SCR catalyst with good anti-sulfur performance. This method needs to use cerium nitrate, manganese nitrate, ethylene glycol, glucose, p-phenylenediamine and other substances, which result in high costs and complex operation, so it is not suitable for large-scale commercial application.

SUMMARY OF THE INVENTION

The objective of the present invention is to provide a preparation method and application of a coated vanadium-tungsten-titanium oxide monolithic SCR catalyst, which achieve a vanadium-tungsten-titanium oxide monolithic SCR catalyst with good catalytic activity at stages of medium and high temperature only by means of an impregnation method, so as to solve the technical problem of a complex process for catalyst preparation and high costs in the art.

The present invention provides a preparation method of a coated vanadium-tungsten-titanium oxide monolithic SCR catalyst applied in exhaust gas post-treatment in a marine diesel engine, comprising the steps of S100, mixing an ammonium metavanadate, ammonium metatungstate, titanium dioxide, an inorganic adhesive, an organic adhesive and a macromolecular surfactant with deionized water and stirring them to obtain a thick liquid with a solid content of 15%-35%, an organic adhesive content of 0.2%-0.5%, and a macromolecular surfactant content of 0.05%-0.2%;

S200, adding a pH adjuster to the thick liquid to make its pH 1.5-4.5;

S300, impregnating a cordierite honeycomb carrier in the thick liquid to obtain a preliminarily-impregnated catalyst; and S400, drying and roasting the preliminarily-impregnated catalyst to obtain a finished catalyst with a $V_2O_5$-to-$WO_3$-to-$TiO_2$ mass ratio of 1:9:90.

Further, the inorganic adhesive is an acidic silica sol solution.

Further, the concentration of the acidic silica sol solution is 30%.

Further, the organic adhesive is one of a 1%-8% polyvinyl alcohol solution, a carboxymethyl cellulose sodium solution and a starch solution.

Further, the macromolecular surfactant is one of polyethylene glycol and Tween-20.

Further, in S300, the impregnating process goes for 30 s-5 min.

Further, in S400, the drying process goes at 70° C.-130° C. for 1 h-5 h, and the roasting process goes at 400° C.-600° C. for 2 h-5 h.

Further, the pH adjuster is nitric acid or ammonia.

The present invention further discloses an application of the coated vanadium-tungsten-titanium oxide monolithic SCR catalyst in exhaust gas post-treatment in a marine diesel engine.

Compared with the prior art, the present invention has the following beneficial effects.

(1) In the present invention, the coated vanadium-tungsten-titanium oxide monolithic SCR catalyst is prepared by means of an impregnation coating method, without necessity to add other transition metal oxides as an active additive for the reaction in the preparation process, so it has the advantages of a low quantity of used precursor material and a high utilization ratio of active components. The process of making up the thick liquid is simple, including the steps of directly applying the thick liquid with active components on the surface of the cordierite catalyst, then obtaining the finished product after drying and roasting it, which have the advantages of simple operation, easy repetition and short time-consuming. Furthermore, of the catalyst according to the present invention the mechanical properties are stable, the vibration resistance is excellent, the stability is strong, and it has excellent structural characteristics and pollutant removal properties when it is applied to watercrafts, so the present invention can reduce the frequency of replacing the catalyst to a certain extent, thereby reducing costs.

(2) The present invention ensures the consistency of fixed parameters in the preparation process by way of adjusting the pH value of the coating thick liquid. The pH of the thick liquid is controlled at 1.5-4.5, so that the prepared vanadium-tungsten-titanium oxide monolithic SCR catalyst has a good loading ratio and shedding ratio, excellent SCR performance between 350-550° C., and a NO conversion ratio of >85%.

BRIEF DESCRIPTION OF THE DRAWINGS

To describe the embodiments of the present invention or the technical solutions in the prior art more clearly, the following briefly introduces the accompanying drawings required for describing the embodiments or the descriptions in the prior art. Apparently, the accompanying drawings in the following description show merely some embodiments of the present invention, and a person of ordinary skill in the art may still derive other drawings from these accompanying drawings without creative efforts.

Figure 6:
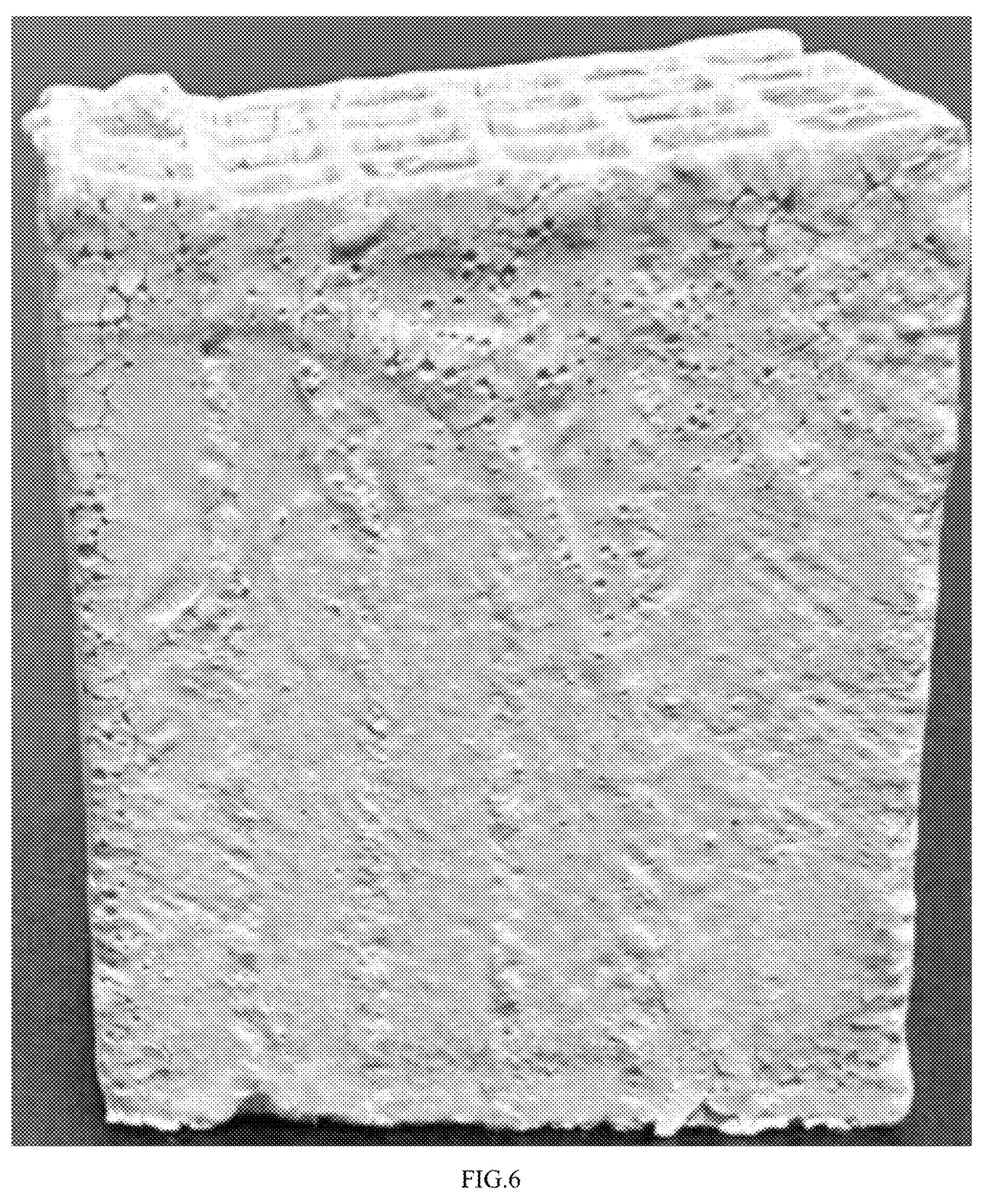

FIG. 6 is a sample picture prepared in Comparison 6 provided by the present invention.

DETAILED DESCRIPTION OF THE PREFERRED EMBODIMENTS

Figure 1:
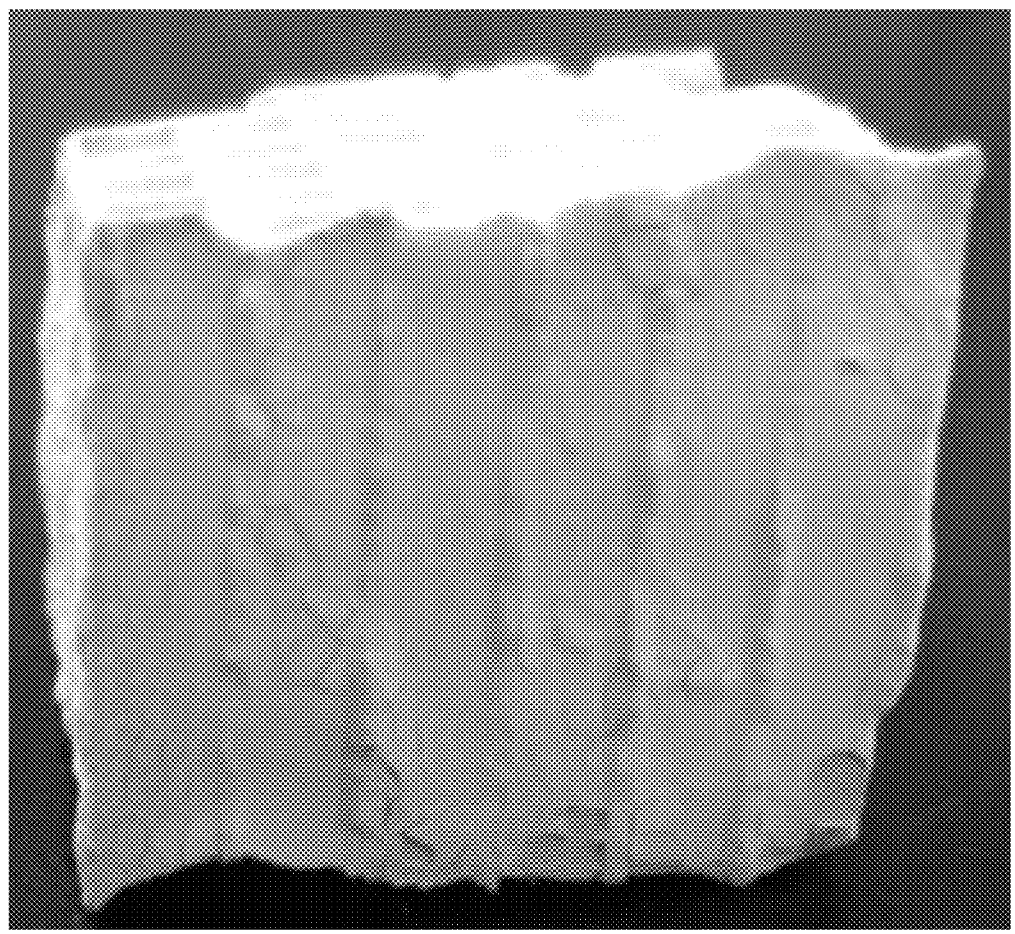
FIG. 1 is a sample picture prepared in Comparison 1 provided by the present invention.

The technical solutions in the embodiments of the present invention will be clearly and completely described as follows in combination with the drawings in the examples of the present invention, but obviously, the described examples are only a part of the embodiments of the present invention, rather than all the embodiments.

Normally, the components described and shown herein may be configured and designed through various arrangements. Therefore, the detailed description of the embodiments of the present invention provided in the accompanying drawings is not intended to limit the scope of the claimed, but only to represent selected embodiments of the present invention.

Based on the examples of the present invention, all other examples obtained by a person skilled in the art without creative efforts shall fall within the protection scope of the present invention.

In the description of the invention, it should be understood that the orientation or position terms such as "center", "upper", "lower", "left", "right", "vertical", "horizontal", "inner", "outer" based on the orientation or position relationship shown in the figures, only facilitate description to the invention and simplification to the description, do not indicate or imply a certainty for the appointed device or element to have a specific orientation, be constructed and operated in a specific orientation. Therefore, they cannot be construed as a limitation on the invention. Moreover, the terms "first", "second" and "third" are used for descriptive purposes only and cannot be understood as indicating or implying relative importance.

In the present invention, the terms "installation", "connected", "connection", "fixing", and the like shall be understood in a broad sense unless otherwise specified and defined. For example, they may be fixed connection, removable connection or integrated connection; may be mechanical connection or electrical connection; and may be direct connection, or indirect connection through an intermediate medium, and connection inside two elements. The specific meanings of the above terms in the present invention may be understood in a specific case by those of ordinary skills in the art.

The present invention provides a preparation method of a coated vanadium-tungsten-titanium oxide monolithic SCR catalyst, including the steps of

S100, mixing a vanadium oxide precursor, a tungsten oxide precursor, titanium dioxide, an inorganic adhesive, an organic adhesive and a macromolecular surfactant with deionized water and stirring them to obtain a thick liquid with a solid content of 15%-35%, an organic adhesive content of 0.2%-0.5%, and a macromolecular surfactant content of 0.05%-0.2%;

S200, adding a pH adjuster to the thick liquid to make its pH 1.5-4.5;

S300, impregnating a cordierite honeycomb carrier in the thick liquid to obtain a preliminarily-impregnated catalyst; and

S400, drying and roasting the preliminarily-impregnated catalyst to obtain a finished catalyst with a $V_2O_5$-to-$WO_3$-to-$TiO_2$ mass ratio of 1:9:90.

Based on the above preparation method of a coated vanadium-tungsten-titanium oxide monolithic SCR catalyst, one of the characteristics of the present invention is that it has the characteristics such as simple experimental operation, easy repetition, low costs and short time-consuming.

Specifically, in the present invention, the coated vanadium-tungsten-titanium monolithic SCR catalyst is prepared by means of an impregnation coating method, without necessity to add other transition metal oxides as an active additive for the reaction in the preparation process, so it has the advantages of a low quantity of used precursor material and a high utilization ratio of active components. Furthermore, the process of making up the thick liquid is simple, including the steps of directly applying the thick liquid with active components on the surface of the cordierite catalyst, then obtaining the finished product after drying and roasting it, which have the advantages of simple operation, easy repetition and short time-consuming.

Further, preferably, the vanadium oxide precursor in the present invention is ammonium metavanadate, and the tungsten oxide precursor is metatungstate, such way of not directly adding the vanadium oxide and the tungsten oxide into the thick liquid in the form of oxides, enables the active component and the additive to keep exerting a catalytic effect.

In the preparation process of the catalyst, adding a certain quantity of additives, such as inorganic adhesives, organic adhesives and macromolecular surfactants can ensure the stability of the thick liquid and active substances, so as to ensure that the coated catalyst has a high loading ratio, high stability and high activity. In the present invention, the inorganic adhesive is a 30% acidic silica sol solution, and the organic adhesive is at least one of a 1%-8% polyvinyl alcohol solution, a sodium carboxymethyl cellulose solution and a starch solution, and the macromolecular surfactant is at least one of polyethylene glycol and Tween-20.

Based on the specific selection of the above-mentioned additives, the second characteristic of the present invention is to select the 30% acidic silica sol solution as the inorganic adhesive.

Specifically, considering that the SCR reaction is mainly influenced by the two factors of redox properties and acidity on the catalyst surface, since the adsorption of $NH_3$ is a necessary process of the SCR reaction, the acidity on the catalyst surface will influence the adsorption capacity of $NH_3$. Therefore, the present invention selects the 30% acidic silica sol solution as the adhesive, which can not only improve the cohesiveness of the coating thick liquid, but also raise the acidity of the catalyst, so that it can maintain excellent activity in the medium and high temperature range.

The third characteristic of the present invention is to add a pH adjuster to the thick liquid to make its pH 1.5-4.5.

Specifically, the precursor ammonium metavanadate is weakly alkaline, the ammonium metatungstate is weakly acidic, and the organic adhesive and the macromolecular surfactant are also weakly acidic, when the catalyst surfactant is impregnated in the coating thick liquid, the pH value concurrently influences the —OH and charge properties of the surface of the carrier $TiO_2$, which have a significant effect on the combination of the active substances reacting on the surface of the SCR catalyst. Therefore, it is very necessary to adjust the pH value of the coating thick liquid, needing to adjust the pH of the coating thick liquid to ensure the consistency of the fixed parameters in the preparation process.

The pH of the thick liquid has a significant effect on the vanadium-tungsten-titanium oxide monolithic SCR catalyst, and with the increase of the pH of the thick liquid, the loading ratio, the shedding ratio, and the NO conversion ratio of the catalyst show a significant decreasing trend, and the cracking degree of the catalyst surface also gradually becomes more serious. It should not be selected that the high pH and the insufficient supply of acidic sites will adversely affect the SCR reaction, thereby reducing the denitrification activity. If the pH is too low, it has a negative effect on the adhesive, making the performance and adhesion of the thick liquid poor. For example, the low pH value causes the hydrolysis of starch chains in some adhesives, so that the viscosity decreases rapidly, or the adhesive is not able to obtain sufficient amount of —OH from the outside to form a 3D structure, thereby inhibiting their adhesion and making the loading effect poor. Furthermore, in view of consideration that of the thick liquid the suitable specificity and the lower zeta potential make the coating smoother, and the surface morphology denser, causing good binding strength and high loading capacity, the case of too lower pH value causes the specificity to change and the zeta potential to increase, so that the effect becomes poor. In addition, the high amount of acid can cause the surface pores to clog rapidly, preventing the active components from entering the carrier pores, thus reducing its loading effect.

In summary, too high pH changes the amount of charge on the surface of the particles of the thick liquid, and the reaction between the particles leads to sedimentation, which makes the thick liquid uneven and results in a poor coating effect. However, too low pH leads to a reduction in the viscosity of the thick liquid and an enhancement to the fluidity, which reduce the loading ratio and adhesion ratio of the catalyst coated with the thick liquid.

Therefore, pH is an important parameter in the preparation of coating thick liquid, preferably 1.5-4.5, and in order not to introduce other impurity ions, nitric acid or ammonia is preferred as a pH adjuster.

In summary, the preparation method of a coated vanadium-tungsten-titanium oxide monolithic SCR catalyst provided by the present invention includes the following steps.

Firstly, as the first step, preparing an organic adhesive solution, dissolving a certain amount of polyvinyl alcohol, sodium carboxymethyl cellulose or starch in deionized water to form a 1%-8% organic adhesive solution.

Then successively adding a certain amount of ammonium metavanadate, ammonium metatungstate, titanium dioxide, a 30% acidic silica sol solution, a macromolecular surfactant, and an organic adhesive to deionized water and stirring them to form thick liquid.

Next adjusting the pH value of the thick liquid to be preferred as 1.5-4.5 with nitric acid or ammonia, so as to enable the final content of the organic adhesive to be preferred as 0.2%-0.5%, and the final content of the macromolecular surfactant to be preferred as 0.05%-0.2%.

Impregnating a cordierite honeycomb carrier in the thick liquid of which the PH has been adjusted, so as to obtain a kind of catalyst which has been preliminarily impregnated for 30 s-5 min.

Then drying and roasting the preliminarily-impregnated catalyst to obtain a finished catalyst with a $V_2O_5$-to-$WO_3$-to-$TiO_2$ mass ratio of 1:9:90. The drying temperature is 120° C. and the time is 3 h, the roasting temperature is 550° C. and the time is 5 h.

Finally, testing the loading ratio, the shedding ratio and the SCR activity of the catalyst prepared in the above steps. Specifically, setting the weight of the cordierite honeycomb carrier as m0, and the weight of the impregnated catalyst as m1, then using ultrapure water as a medium, immersing the catalyst samples prepared in the above steps in water under ultrasonic treatment for 20 min, and then drying it at 110° C. for 5 h, weighing the catalyst as m2. The loading ratio and shedding ratio of the catalyst are calculated by the following formula.

$$\text{Loading ratio} = \frac{m_1 - m_0}{m_0} \quad \text{Equation (1)}$$

$$\text{Shedding ratio} = \frac{m_1 - m_2}{m_1 - m_0} \quad \text{Equation (2)}$$

The reaction conditions for testing SCR activity are as follows: 500 ppm NO, 500 ppm $NH_3$, 10% $O_2$, $N_2$ as balanced gas. Collecting data at intervals of 50° C. in the temperature range of 200-550° C., enabling the reaction at each temperature to last at least 30 min, then recording the NO removal ratio at diverse temperature points.

We shall describe the present invention in detail by way of the following examples.

Example 1

Polyvinyl alcohol is used as the organic adhesive, Tween-20 is used as the macromolecular surfactant, and the solid content in the thick liquid is 25%.

i.(1) Dissolving a certain amount of polyvinyl alcohol in deionized water to form a 5% solution.

ii.(2) Successively adding a certain amount of ammonium metavanadate, ammonium metatungstate, titanium dioxide, a 30% acidic silica sol solution and Tween-20 in deionized water to dissolve them in it and stirring the solution, then adding the solution obtained in step (1) while stirring to form a thick liquid, next adjusting the pH value of the thick liquid to 1.5, so that the final content of polyvinyl alcohol is 0.2%, and the final content of Tween-20 is 0.1%.

iii.(3) Impregnating a cordierite honeycomb carrier in the thick liquid prepared in step (2), so as to obtain a kind of catalyst which has been preliminarily impregnated for 5 min.

iv.(4) Drying and roasting the preliminarily-impregnated catalyst to obtain a finished catalyst with a $V_2O_5$-to-$WO_3$-to-$TiO_2$ mass ratio of 1:9:90. Of the catalyst the drying temperature is 120° C. and the time is 3 h, the roasting temperature is 550° C. and the time is 5 h.

Example 2

Starch is used as the organic adhesive, Polyethylene glycol is used as the macromolecular surfactant, and the solid content in the thick liquid is 30%.

i.(1) Dissolving a certain amount of starch in deionized water to form a 8% solution.

ii.(2) Successively adding a certain amount of ammonium metavanadate, ammonium metatungstate, titanium dioxide, a 30% acidic silica sol solution and polyethylene glycol in deionized water to dissolve them in it and stirring the solution, then adding the solution obtained in step (1) while stirring to form a thick liquid, next adjusting the pH value of the thick liquid to 3, so that the final content of starch is 0.3%, and the final content of polyethylene glycol is 0.5%.

iii.(3) Impregnating a cordierite honeycomb carrier in the thick liquid prepared in step (2), so as to obtain a kind of catalyst which has been preliminarily impregnated for 3 min.

iv.(4) Drying and roasting the preliminarily-impregnated catalyst to obtain a finished catalyst with a $V_2O_5$-to-$WO_3$-to-$TiO_2$ mass ratio of 1:9:90. Of the catalyst the drying temperature is 120° C. and the time is 3 h, the roasting temperature is 550° C. and the time is 5 h.

Example 3

Sodium carboxymethyl cellulose is used as the organic adhesive, Polyethylene glycol is used as the macromolecular surfactant, and the solid content in the thick liquid is 22%.

i.(1) Dissolving a certain amount of sodium carboxymethyl cellulose in deionized water to form a 3% solution.

ii.(2) Successively adding a certain amount of ammonium metavanadate, ammonium metatungstate, titanium dioxide, a 30% acidic silica sol solution and polyethylene glycol in deionized water to dissolve them in it and stirring the solution, then adding the solution obtained in step (1) while stirring to form a thick liquid, next adjusting the pH value of the thick liquid to 4.5, so that the final content of sodium carboxymethyl cellulose is 0.5%, and the final content of polyethylene glycol is 0.2%.

iii.(3) Impregnating a cordierite honeycomb carrier in the thick liquid prepared in step (2), so as to obtain a kind of catalyst which has been preliminarily impregnated for 30 s.

iv.(4) Drying and roasting the preliminarily-impregnated catalyst to obtain a finished catalyst with a $V_2O_5$-to-$WO_3$-to-$TiO_2$ mass ratio of 1:9:90. Of the catalyst the drying temperature is 120° C. and the time is 3 h, the roasting temperature is 550° C. and the time is 5 h.

Example 4

Polyvinyl alcohol is used as the organic adhesive, Tween-20 is used as the macromolecular surfactant, and the solid content in the thick liquid is 27%.

i.(1) Dissolving a certain amount of polyvinyl alcohol in deionized water to form a 7% solution.

ii.(2) Successively adding a certain amount of ammonium metavanadate, ammonium metatungstate, titanium dioxide, a 30% acidic silica sol solution and Tween-20 in deionized water to dissolve them in it and stirring the solution, then adding the solution obtained in step (1) while stirring to form a thick liquid, next adjusting the pH value of the thick liquid to 1.5, so that the final content of polyvinyl alcohol is 0.4%, and the final content of Tween-20 is 0.1%.

iii.(3) Impregnating a cordierite honeycomb carrier in the thick liquid prepared in step (2), so as to obtain a kind of catalyst which has been preliminarily impregnated for 4 min.

iv.(4) Drying and roasting the preliminarily-impregnated catalyst to obtain a finished catalyst with a $V_2O_5$-to-$WO_3$-to-$TiO_2$ mass ratio of 1:9:90. Of the catalyst the drying temperature is 120° C. and the time is 3 h, the roasting temperature is 550° C. and the time is 5 h.

Comparison 1

Polyvinyl alcohol is used as the organic adhesive, Tween-20 is used as the macromolecular surfactant, and the solid content in the thick liquid is 25%.

i.(1) Firstly, preparing a $V_2O_5$—$WO_3/TiO_2$ sample through over-volume impregnation.

ii.(2) Dissolving a certain amount of polyvinyl alcohol in deionized water to form a 5% solution.

iii.(3) Successively adding the already-prepared $V_2O_5$—$WO_3/TiO_2$ sample, an aluminum sol and Tween-20 in deionized water to dissolve them in it and stirring the solution, then adding the solution obtained in step (2) while stirring to form a thick liquid, next adjusting the pH value of the thick liquid to 1.5, so that the final content of polyvinyl alcohol is 0.2%, and the final content of Tween-20 is 0.1%.

iv.(4) Impregnating a cordierite honeycomb carrier in the thick liquid prepared in step (3), so as to obtain a kind of catalyst which has been preliminarily impregnated for 5 min.

v.(5) Drying and roasting the preliminarily-impregnated catalyst to obtain a finished catalyst with a $V_2O_5$-to-$WO_3$-to-$TiO_2$ mass ratio of 1:9:90. Of the catalyst the drying temperature is 120° C. and the time is 3 h, the roasting temperature is 550° C. and the time is 5 h.

Comparison 2

Polyvinyl alcohol is used as the organic adhesive, Tween-20 is used as the macromolecular surfactant, and the solid content in the thick liquid is 25%.

i.(1) Dissolving a certain amount of polyvinyl alcohol in deionized water to form a 5% solution.

ii.(2) Successively adding a certain amount of ammonium metavanadate, ammonium metatungstate, titanium dioxide, a 30% acidic silica sol solution and Tween-20 in deionized water to dissolve them in it and stirring the solution, then adding the solution obtained in step (1) while stirring to form a thick liquid, next adjusting the pH value of the thick liquid to 7.5, so that the final content of polyvinyl alcohol is 0.2%, and the final content of Tween-20 is 0.1%.

iii.(3) Impregnating a cordierite honeycomb carrier in the thick liquid prepared in step (2), so as to obtain a kind of catalyst which has been preliminarily impregnated for 5 min.

iv.(4) Drying and roasting the preliminarily-impregnated catalyst to obtain a finished catalyst with a $V_2O_5$-to-$WO_3$-to-$TiO_2$ mass ratio of 1:9:90. Of the catalyst the drying temperature is 120° C. and the time is 3 h, the roasting temperature is 550° C. and the time is 5 h.

Comparison 3

Polyvinyl alcohol is used as the organic adhesive, Tween-20 is used as the macromolecular surfactant, and the solid content in the thick liquid is 25%.

i.(1) Dissolving a certain amount of polyvinyl alcohol in deionized water to form a 5% solution.

ii.(2) Successively adding a certain amount of ammonium metavanadate, ammonium metatungstate, titanium dioxide, a 30% acidic silica sol solution and Tween-20 in deionized water to dissolve them in it and stirring the solution, then adding the solution obtained in step (1) while stirring to form a thick liquid, next adjusting the pH value of the thick liquid to 0.5, so that the final content of polyvinyl alcohol is 0.2%, and the final content of Tween-20 is 0.1%.

iii.(3) Impregnating a cordierite honeycomb carrier in the thick liquid prepared in step (2), so as to obtain a kind of catalyst which has been preliminarily impregnated for 5 min.

iv.(4) Drying and roasting the preliminarily-impregnated catalyst to obtain a finished catalyst with a $V_2O_5$-to-$WO_3$-to-$TiO_2$ mass ratio of 1:9:90. Of the catalyst the drying temperature is 120° C. and the time is 3 h, the roasting temperature is 550° C. and the time is 5 h.

Comparison 4

Polyvinyl alcohol is used as the organic adhesive, Tween-20 is used as the macromolecular surfactant, and the solid content in the thick liquid is 25%.

i.(1) Dissolving a certain amount of polyvinyl alcohol in deionized water to form a 5% solution.

ii.(2) Successively adding a certain amount of ammonium metavanadate, ammonium metatungstate, titanium dioxide, a 30% acidic silica sol solution and Tween-20 in deionized water to dissolve them in it and stirring the solution, then adding the solution obtained in step (1) while stirring to form a thick liquid, next adjusting the pH value of the thick liquid to 1, so that the final content of polyvinyl alcohol is 0.2%, and the final content of Tween-20 is 0.1%.

iii.(3) Impregnating a cordierite honeycomb carrier in the thick liquid prepared in step (2), so as to obtain a kind of catalyst which has been preliminarily impregnated for 5 min.

iv.(4) Drying and roasting the preliminarily-impregnated catalyst to obtain a finished catalyst with a $V_2O_5$-to-$WO_3$-to-$TiO_2$ mass ratio of 1:9:90. Of the catalyst the drying temperature is 120° C. and the time is 3 h, the roasting temperature is 550° C. and the time is 5 h.

Comparison 5

Polyvinyl alcohol is used as the organic adhesive, Tween-20 is used as the macromolecular surfactant, and the solid content in the thick liquid is 25%.

(1) Dissolving a certain amount of polyvinyl alcohol in deionized water to form a 5% solution.

(2) Successively adding a certain amount of ammonium metavanadate, ammonium metatungstate, titanium dioxide, a 30% acidic silica sol solution and Tween-20 in deionized water to dissolve them in it and stirring the solution, then adding the solution obtained in step (1) while stirring to form a thick liquid, next adjusting the pH value of the thick liquid to 1.5, so that the final content of polyvinyl alcohol is 0.1%, and the final content of Tween-20 is 0.1%.

(3) Impregnating a cordierite honeycomb carrier in the thick liquid prepared in step (2), so as to obtain a kind of catalyst which has been preliminarily impregnated for 5 min.

(4) Drying and roasting the preliminarily-impregnated catalyst to obtain a finished catalyst with a $V_2O_5$-to-$WO_3$-to-$TiO_2$ mass ratio of 1:9:90. Of the catalyst the drying temperature is 120° C. and the time is 3 h, the roasting temperature is 550° C. and the time is 5 h.

Comparison 6

Polyvinyl alcohol is used as the organic adhesive, Tween-20 is used as the macromolecular surfactant, and the solid content in the thick liquid is 25%.

(1) Dissolving a certain amount of polyvinyl alcohol in deionized water to form a 5% solution.

(2) Successively adding a certain amount of ammonium metavanadate, ammonium metatungstate, titanium dioxide, a 30% acidic silica sol solution and Tween-20 in deionized water to dissolve them in it and stirring the solution, then adding the solution obtained in step (1) while stirring to form a thick liquid, next adjusting the pH value of the thick liquid to 1.5, so that the final content of polyvinyl alcohol is 0.2%, and the final content of Tween-20 is 0.3%.

(3) Impregnating a cordierite honeycomb carrier in the thick liquid prepared in step (2), so as to obtain a kind of catalyst which has been preliminarily impregnated for 5 min.

(4) Drying and roasting the preliminarily-impregnated catalyst to obtain a finished catalyst with a $V_2O_5$-to-$WO_3$-to-$TiO_2$ mass ratio of 1:9:90. Of the catalyst the drying temperature is 120° C. and the time is 3 h, the roasting temperature is 550° C. and the time is 5 h.

The test results of the loading ratio and shedding ratio of the catalysts prepared in the above examples are shown in the following table:

| SERIAL No. | EXAMPLE 1 | EXAMPLE 2 | EXAMPLE 3 | EXAMPLE 4 | COMPARISON 1 | COMPARISON 2 | COMPARISON 3 | COMPARISON 4 | COMPARISON 5 | COMPARISON 6 |
|---|---|---|---|---|---|---|---|---|---|---|
| loading ratio (%) | 28.52 | 40.39 | 20.77 | 36.48 | 11.11 | 29.02 | 24.94 | 27.97 | 21.15 | 32.37 |
| shedding ratio (%) | 9.91 | 19.55 | 5.88 | 14.08 | 14.06 | 44.3 | 31.45 | 15.25 | 11.52 | 19.49 |

Figure 2:
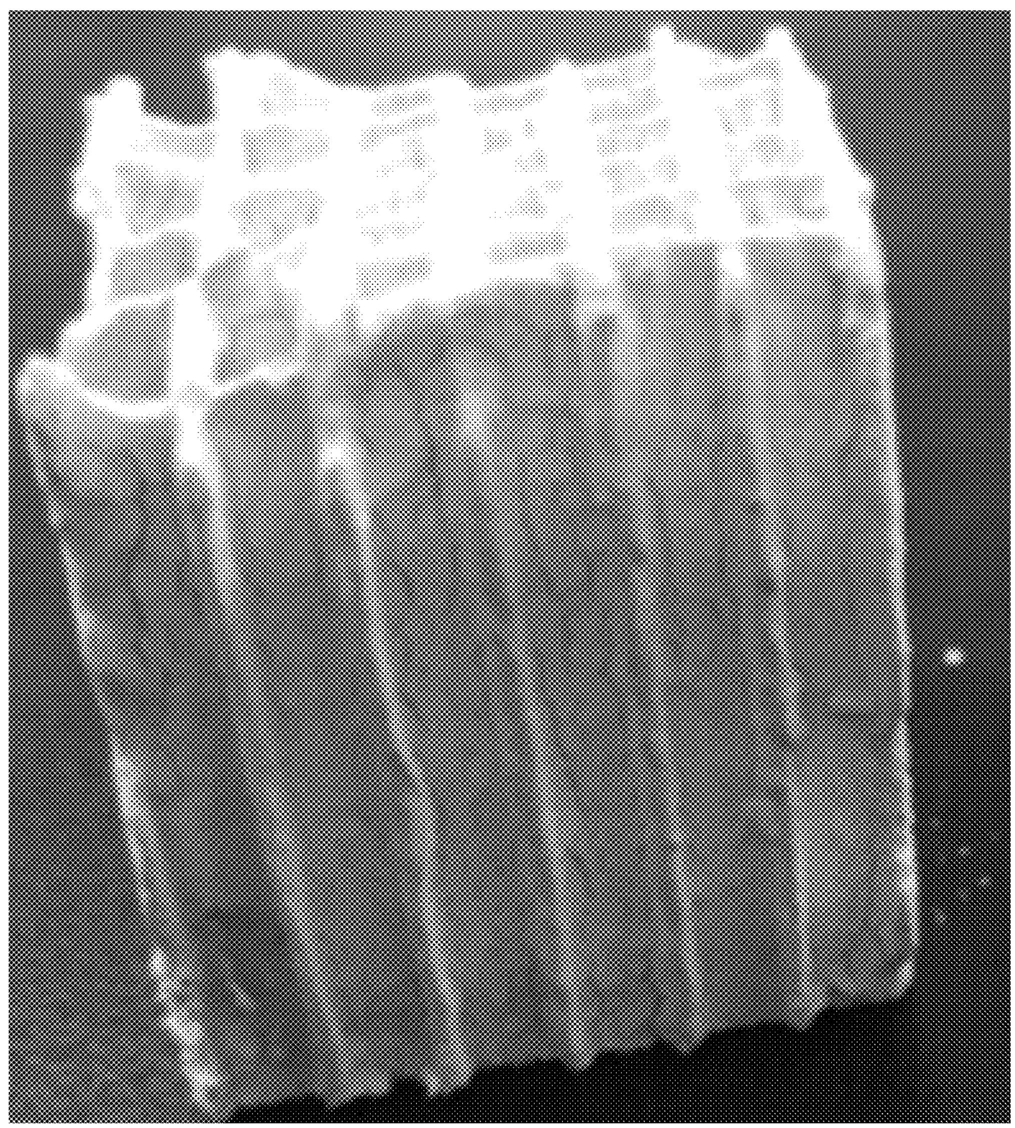
FIG. 2 is a sample picture prepared in Comparison 2 provided by the present invention.
Figure 3:
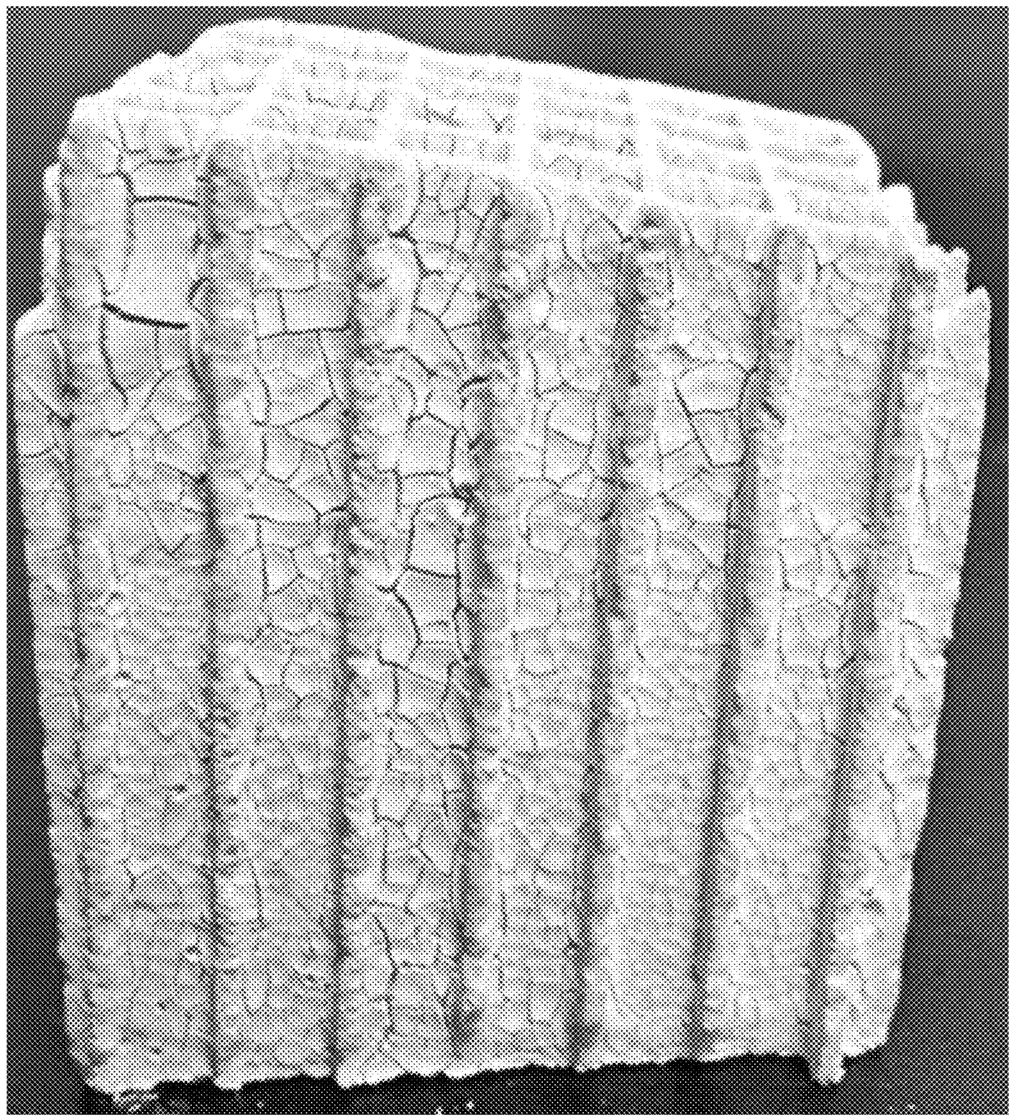
FIG. 3 is a sample picture prepared in Comparison 3 provided by the present invention.
Figure 4:
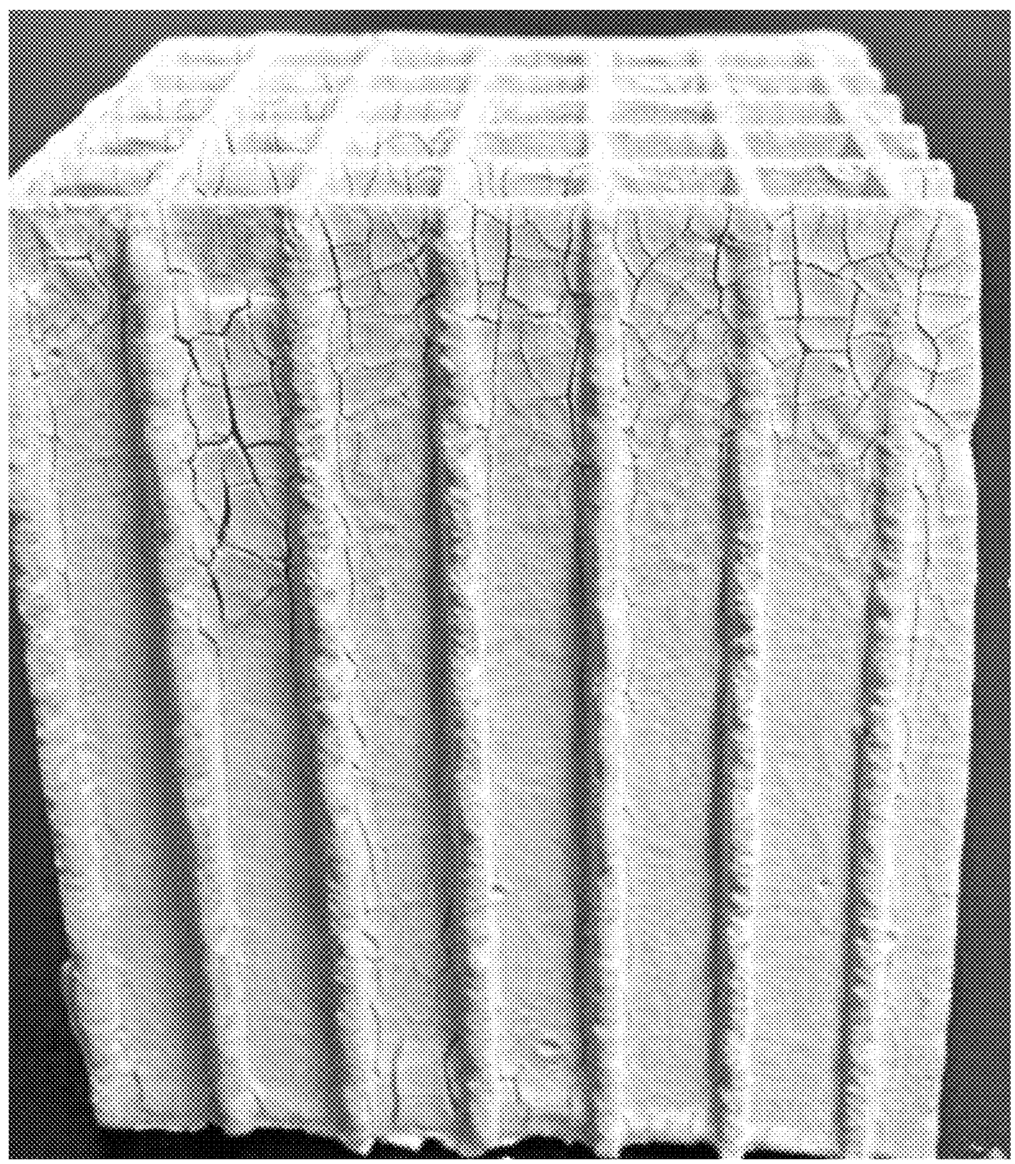
FIG. 4 is a sample picture prepared in Comparison 4 provided by the present invention.
Figure 5:
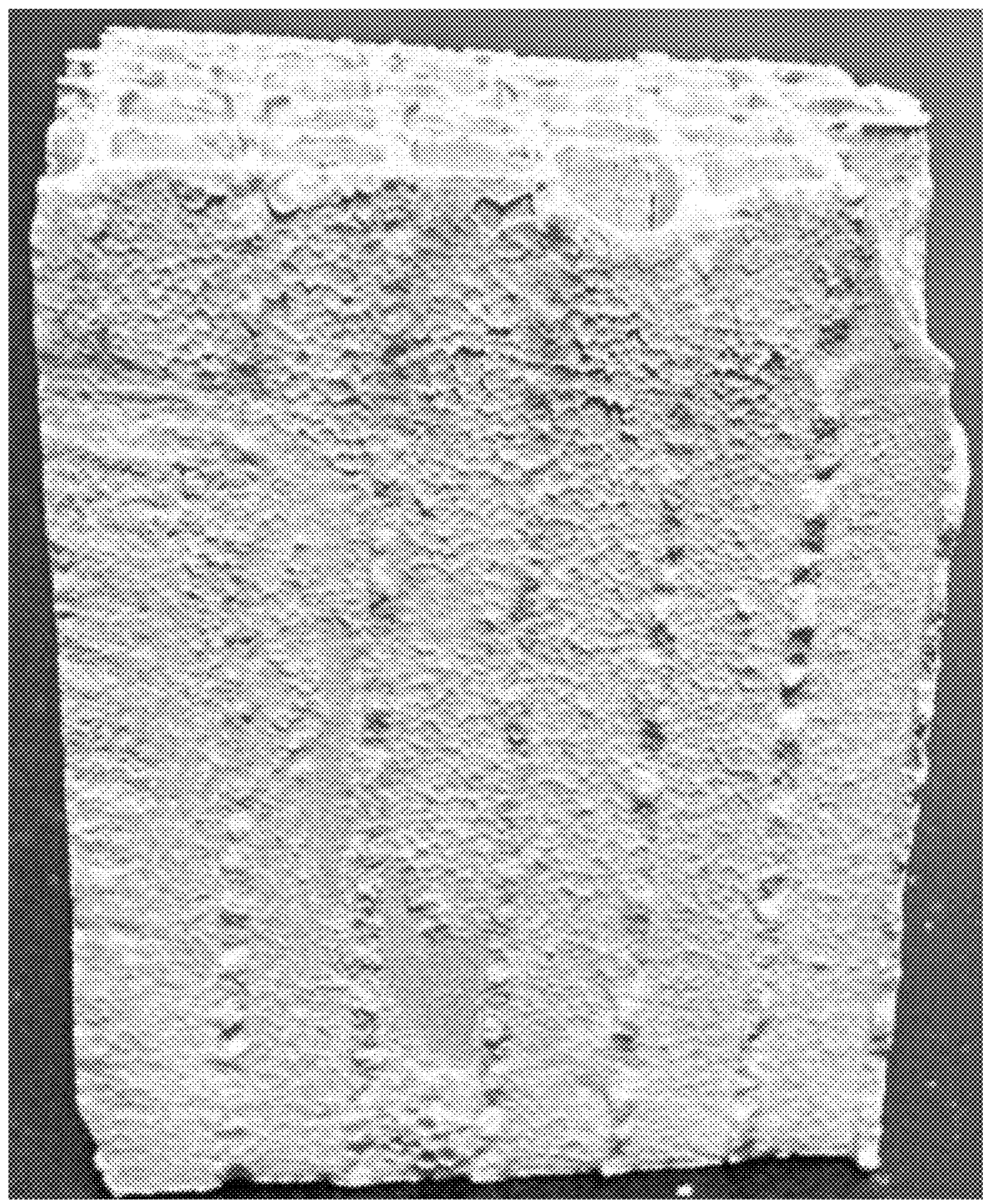
FIG. 5 is a sample picture prepared in Comparison 5 provided by the present invention.
Figure 7:
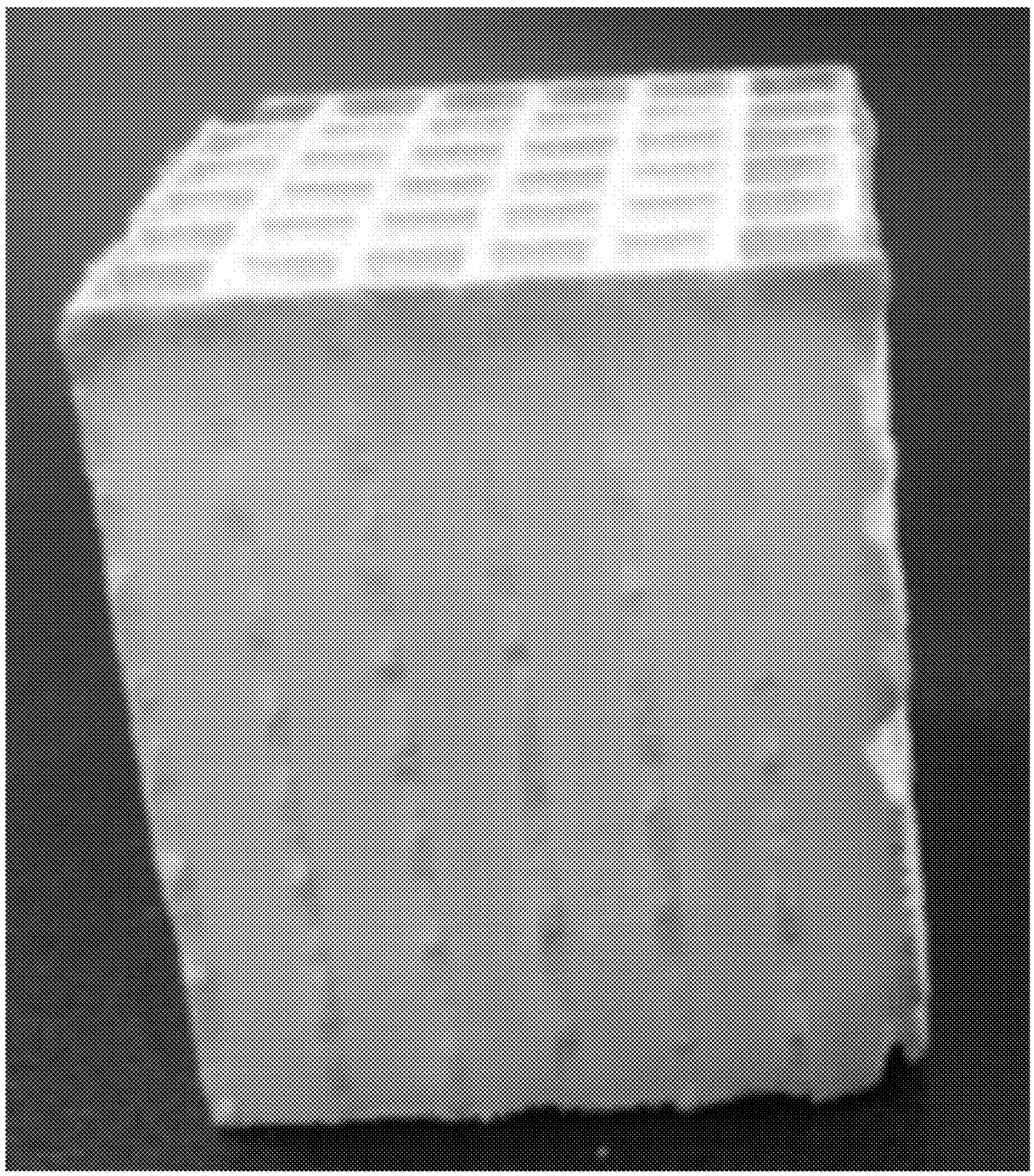
FIG. 7 is a sample picture prepared in Example 1 provided by the present invention.
Figure 8:
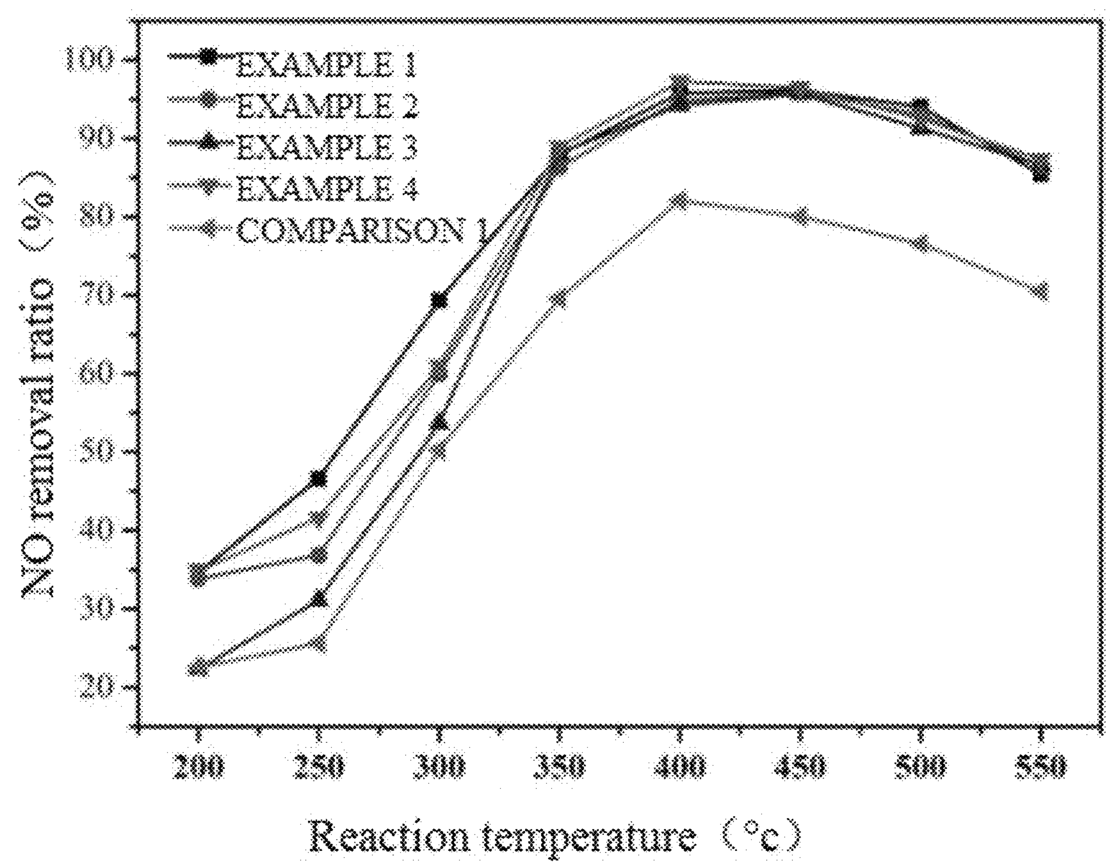
FIG. 8 is a comparison diagram about the SCR activity of the catalysts in Examples 1-4 and Comparison 1 provided by the present invention.
Figure 9:
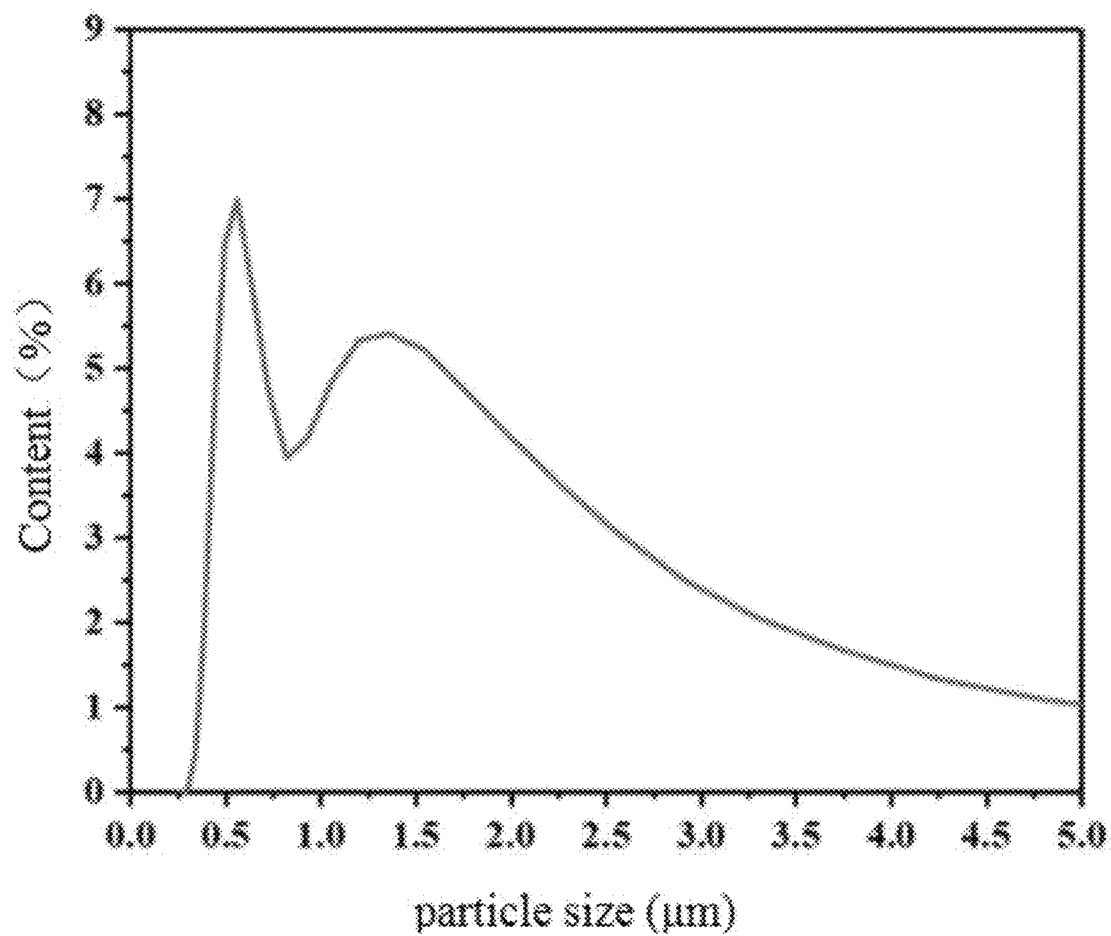
FIG. 9 is a picture about the particle size of the thick liquid in Example 1 provided by the present invention.
Figure 10:
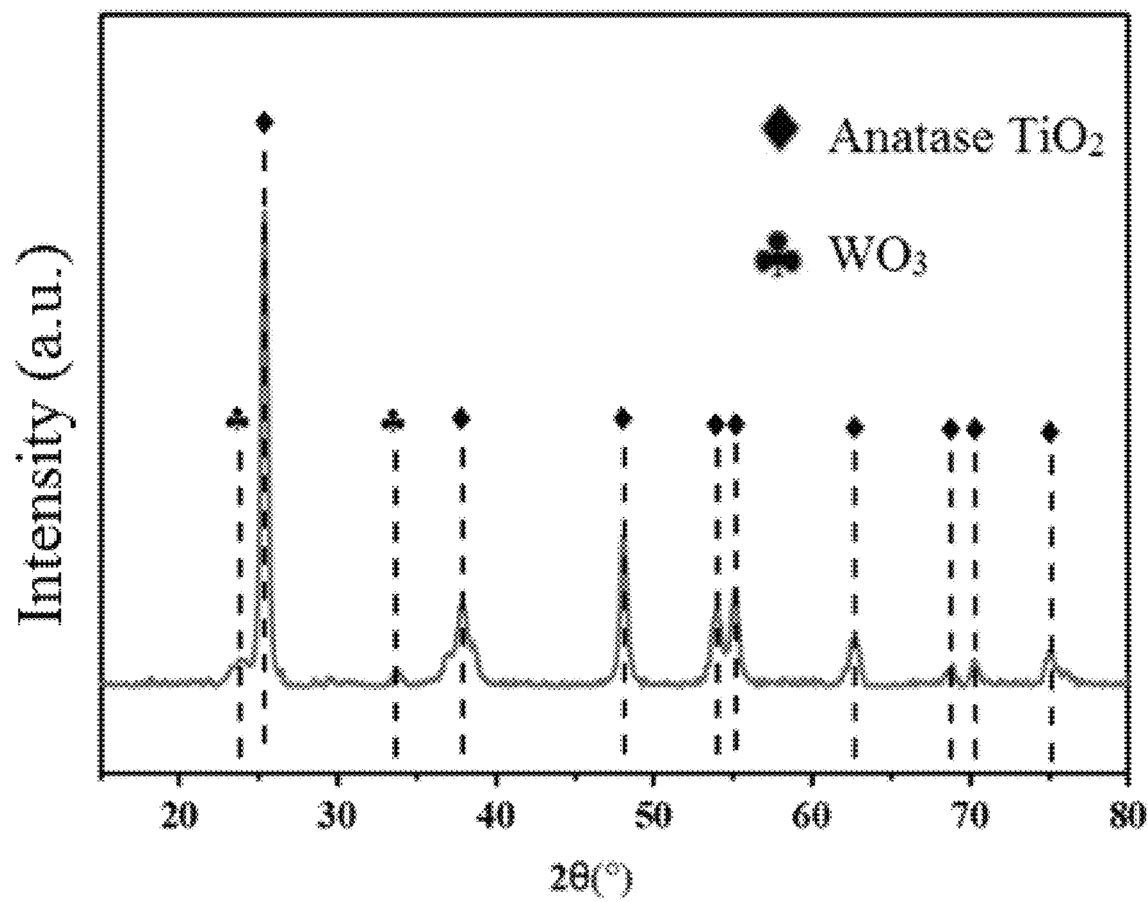
FIG. 10 is a XRD picture in Example 1 provided by the present invention.
Figure 11:
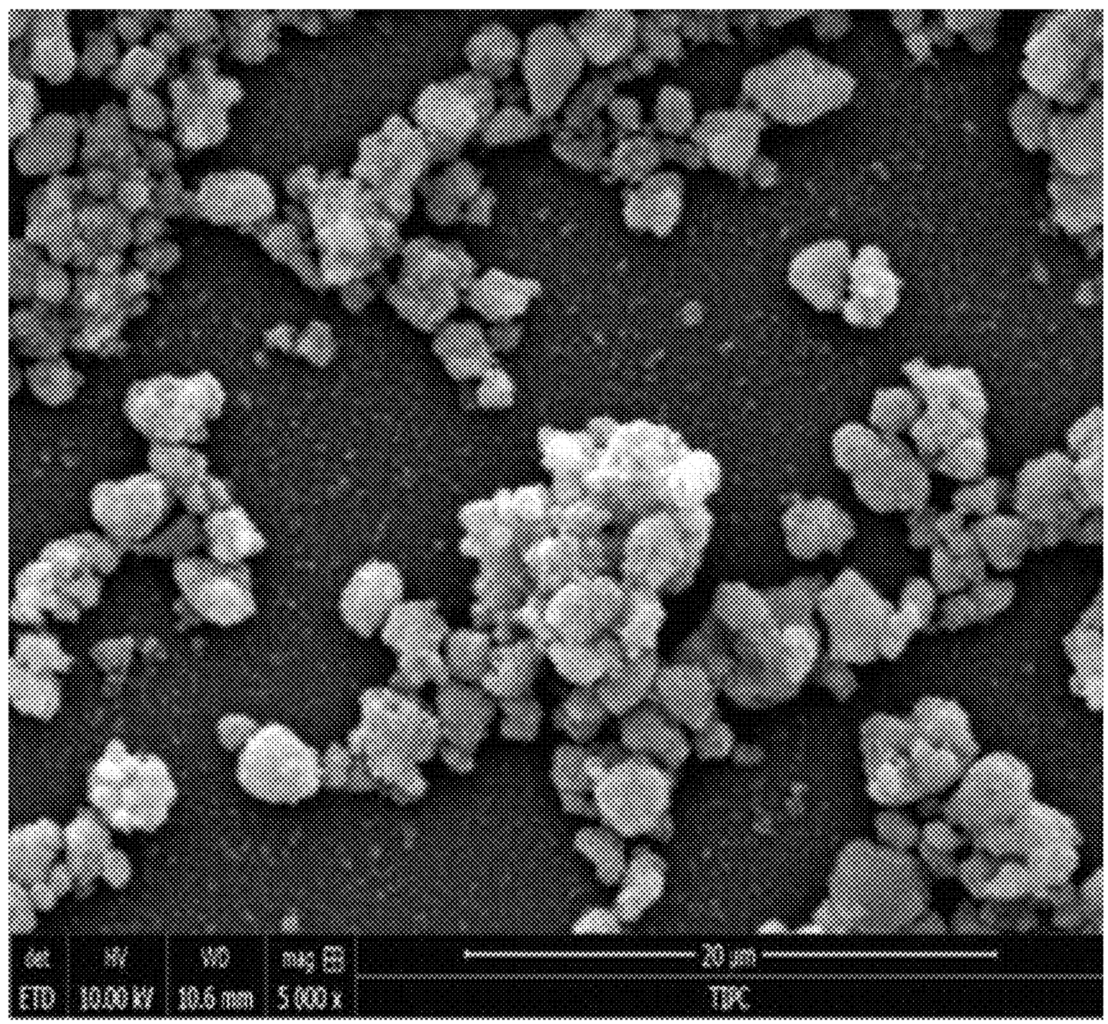
FIG. 11 is a SEM picture of Example 1 provided by the present invention.
Figure 12:
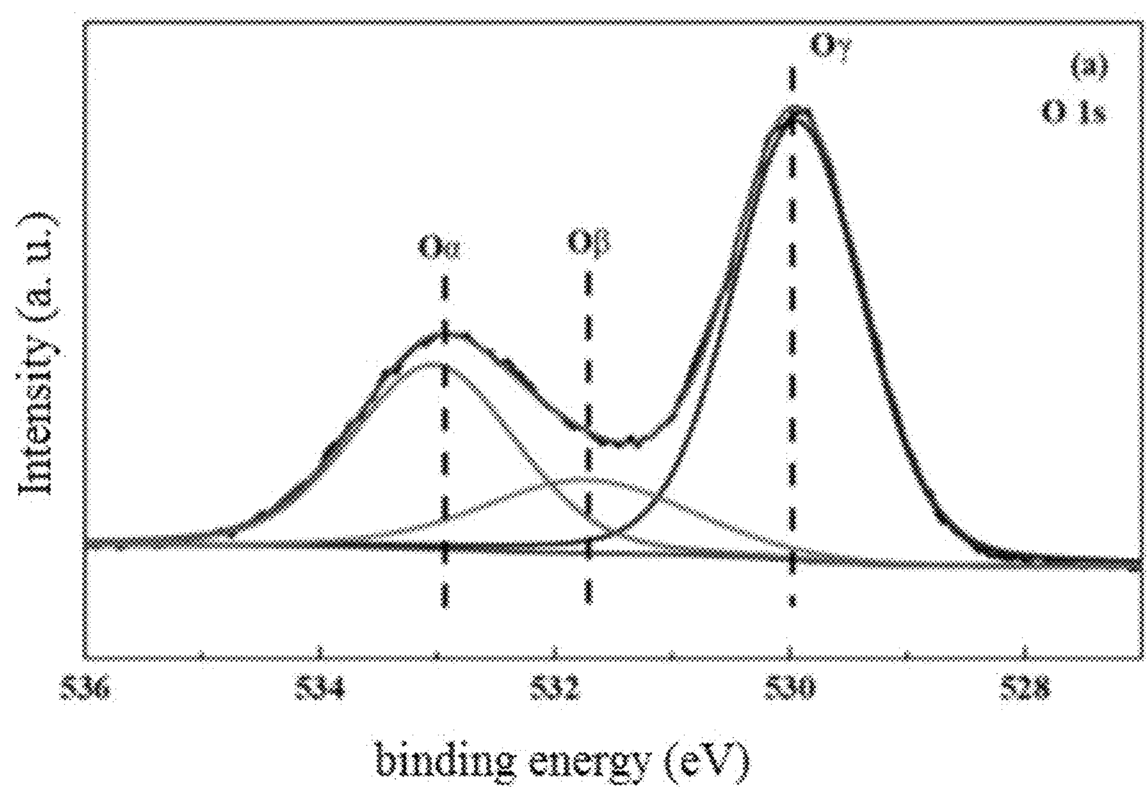
FIG. 12 is a XPS O 1s analysis diagram in Example 1 provided by the present invention.
Figure 13:
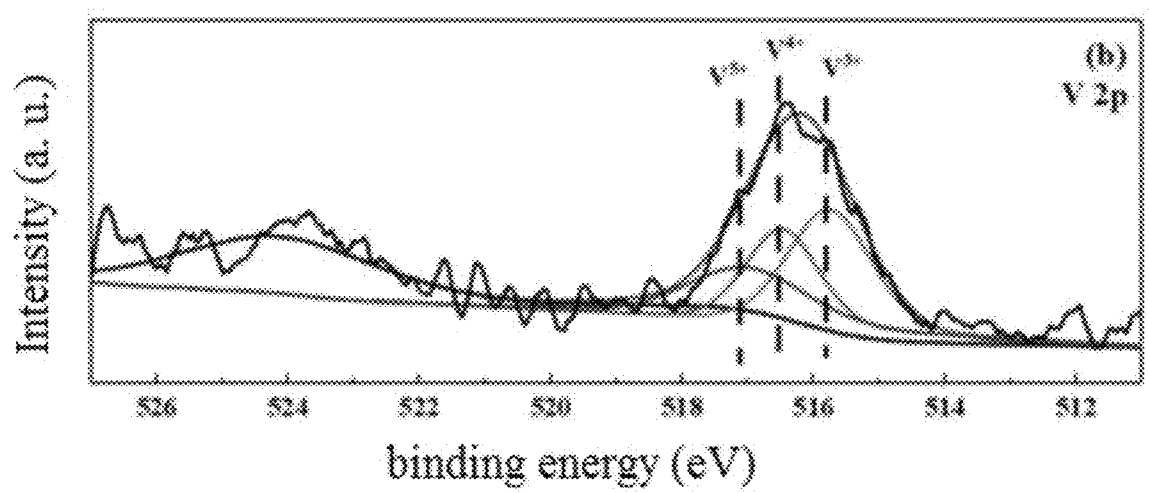
FIG. 13 is a XPS V 2p analysis diagram in Example 1 provided by the present invention.

In the above table and in FIGS. 1-13,

It can be seen from EXAMPLE 1 and COMPARISON 1 that: the loading ratio in the COMPARISON 1 is significantly lower than that in EXAMPLE 1, the sample picture prepared in COMPARISON 1 has more cracks, its quality is significantly lower than that of EXAMPLE 1, and its SCR activity is also significantly lower than that of EXAMPLE 1, therefore, in the present invention, the added vanadium precursor and tungsten precursor have a significant effect on the performance of the catalyst.

It can be seen from EXAMPLE 1 and COMPARISONS 2-4 that: although the loading ratio of COMPARISONS 2-4 is equivalent to that of EXAMPLE 1, their shedding ratio is significantly higher than that of EXAMPLE 1; therefore, in the present invention, the pH of the thick liquid has a significant effect on the performance of the catalyst.

It can be seen from EXAMPLE 1 and COMPARISONS 5-6 that: the shedding ratio of COMPARISONS 5-6 is significantly higher than that of EXAMPLE 1; therefore, in the present invention, the proportion of the additives has a significant effect on the performance of the catalyst.

Specifically, the inappropriate additive content may lead to defects on the catalyst surface, which can affect the loading effect. Mainly due to the thermal tension and mechanical tension during the drying process, if the addition is less, the active components cannot be loaded on it, if the addition is more, the pores will clog. The relation between the additive content and its shedding ratio can be demonstrated by way of linear fitting of Weibull two-parameter distribution, showing two delamination mechanisms, namely internal delamination and interfacial delamination. The internal delamination mode is a peeling process caused by the mutual stress between the active component particles, and the interfacial delamination mode is a peeling process between the interfaces of the active component and the carrier surface, and the additive content may influence both the delamination mechanisms.

Finally, it can be seen from summarization on EXAMPLES 1-4 that the coated vanadium-tungsten-titanium oxide monolithic SCR catalyst prepared in the present invention has a good loading ratio and shedding ratio, excellent SCR performance between 350-550° C., and a NO conversion ratio of >85%, it also has the advantages of excellent structure and pollutant removal performance, so it is especially suitable for the field of marine diesel engines with relatively-high exhaust temperature, and can carry out post-treatment of nitrogen oxides in exhaust gas.

It should be noted that the above examples are only used to describe the technical solution of the present invention, not to impose a limitation on it. Although the present invention is described in detail with reference to the aforementioned examples, a person skilled in the art should understand that he/she can still modify the technical solution described in the aforementioned examples, or equivalently substitute part or the whole of the technical feature therein, and these modifications or substitutions do not make the essence of the corresponding technical solution depart from the scope of the technical solutions of the examples of the present invention.

What is claimed is:

1. A preparation method of a coated vanadium-tungsten-titanium oxide monolithic SCR catalyst applied in exhaust gas post-treatment in a marine diesel engine, comprising the steps of S100, mixing a vanadium oxide precursor, a tungsten oxide precursor, titanium dioxide, an inorganic adhesive, an organic adhesive and a macromolecular surfactant with deionized water and stirring them to obtain a thick liquid with a solid content of 25%, an organic adhesive content of 0.2%, and a macromolecular surfactant content of 0.1%;

S200, adding a pH adjuster to the thick liquid to make its pH 1.5;

S300, impregnating a cordierite honeycomb carrier in the thick liquid to obtain a preliminarily-impregnated catalyst; and S400, drying and roasting the preliminarily-impregnated catalyst to obtain a finished catalyst with a $V_2O_5$-to-$WO_3$-to-$TiO_2$ mass ratio of 1:9:90;

wherein, said vanadium oxide precursor is ammonium metavanadate;

said tungsten oxide precursor is ammonium metatungstate;

said pH adjuster is nitric acid or ammonia;

said inorganic adhesive is a 30% acidic silica sol solution;

said organic adhesive is at least one of a 1%-8% polyvinyl alcohol solution, a carboxymethyl cellulose sodium solution and a starch solution;

said macromolecular surfactant is at least one of polyethylene glycol and Tween-20;

in S400, the drying goes at 70° C.-130° C. for 1 h-5 h, and the roasting goes at 400° C.-600° C. for 2 h-5 h.

2. The preparation method according to claim 1, wherein in S300, the impregnating process goes for 30 s-5 min.

3. A method of post-treating an exhaust gas in a marine diesel engine comprising exposing the exhaust gas with the coated vanadium-tungsten-titanium oxide monolithic SCR catalyst prepared according to claim 1.

* * * * *